J. H. Davis,
Globe Valve.
No. 3,823. Reissued Feb. 8. 1870.
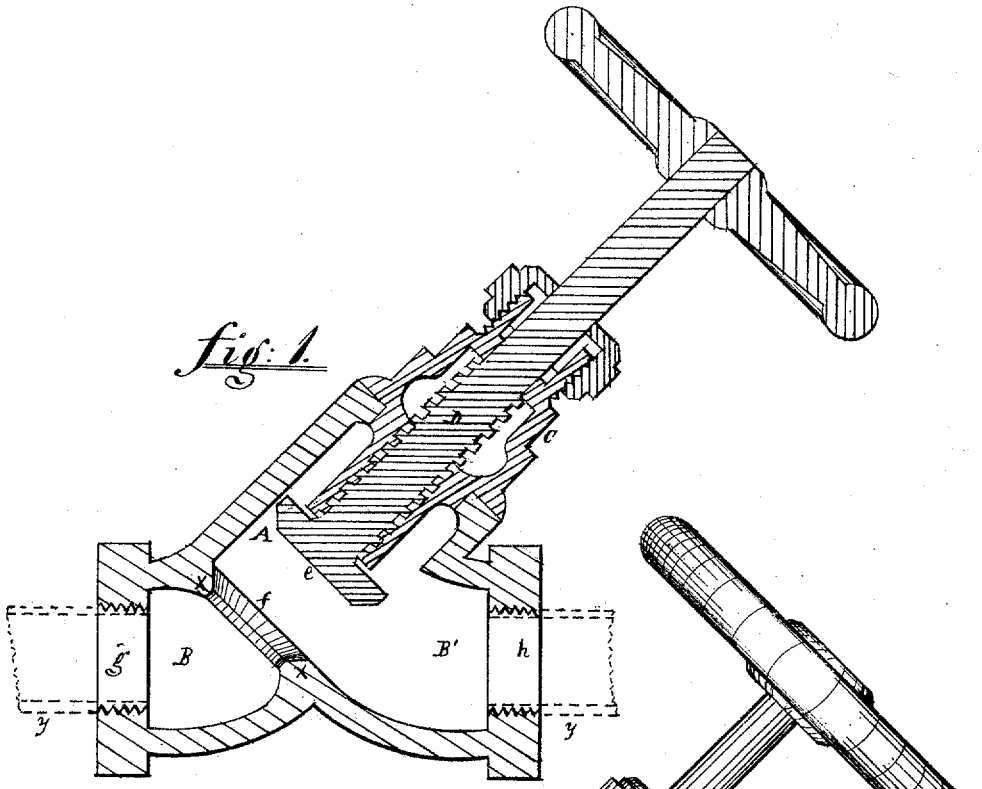
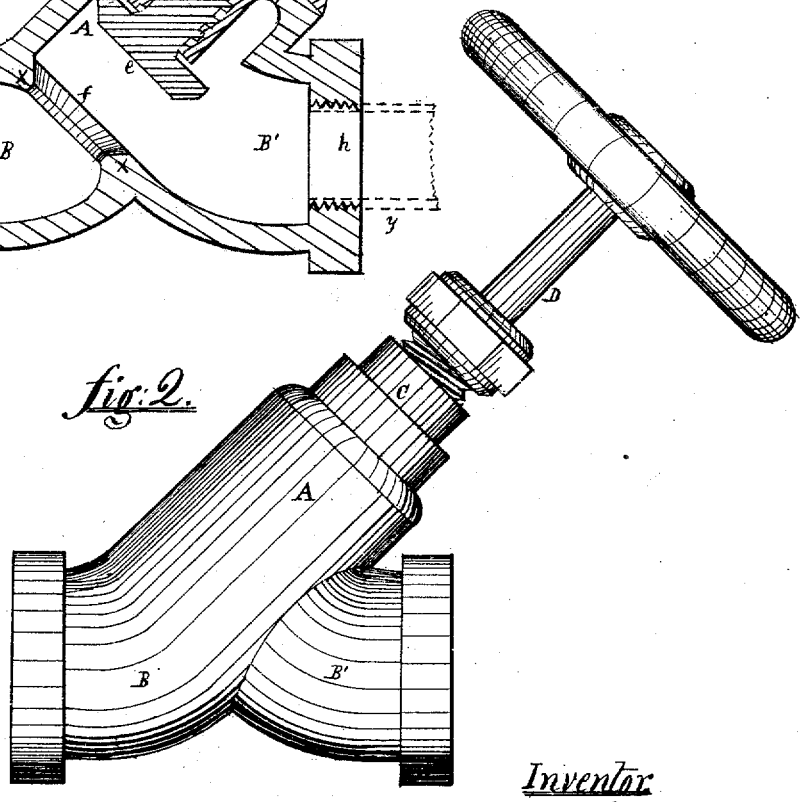
Witnesses:
A. C. Johnston
Jas. G. Thompson.
Inventor:
J. H. Davis
N. PETERS, PHOTO-LITHOGRAPHER, WASHINGTON, D. C.

United States Patent Office.

JOSEPH H. DAVIS, OF ALLEGHENY CITY, PENNSYLVANIA.

*Letters Patent No.* 85,288, *dated December*, 29, 1868; *reissue No.* 3,823, *dated February* 8, 1870.

IMPROVEMENT IN STOP-VALVES.

The Schedule referred to in these Letters Patent and making part of the same.

*To all whom it may concern:*

Be it known that I, JOSEPH H. DAVIS, of the city and county of Allegheny, and State of Pennsylvania, have invented a new and useful Improvement in "Stop-Valves" for Steam and other Engnery; and I do hereby declare that the following is a full, clear, and exact description thereof, reference being had to the accompanying drawings, and to the letters of reference marked thereon.

The nature of my invention consists in so constructing a valve-cock that the bore of the valve-chamber, and the bore of the body of the valve-cock shall be the same in diameter, the valve-chamber being arranged with reference to the axis of the body of the valve-cock at an angle of about forty-five degrees, which enables the area of the surface of the valve to be diminished, and an opening in the valve-seat obtained, equal in diameter to the diameter of the bore of the pipe attached to the body of the valve.

To enable others skilled in the art to make and use my invention, I will proceed to describe its construction a d operation.

In the accompanying drawings, which form part of my specification—

Figure 1 represents a vertical section of my improvement in stop-valves.

Figure 2 is a side elevation of the same.

In the drawings—

A represents the valve-chamber.

B B′ represent the body of the valve-cock.

C represents the ordinary mountings of a stop-valve.

D represents the valve-stem, and

*e*, the valve.

*f* represents the opening in the valve-seat.

*g* and *h* represent the openings into which the coupling-pipes are "screwed."

In constructing the ordinary and well-known form of "stop-valves" or valve-cocks, it is necessary, under all sizes of construction, to make the valve-chamber of greater diameter than the diameter or bore of the body of the valve, when it is desirable to have the opening in the valve-seat of the same diameter as the opening or bore of the coupling-pipes, (which are indicated by dotted lines at *y*.)

To simplify the construction, and have the opening in the valve-seat of the same diameter as the opening or bore of the pipe or pipes to be connected or attached to the body of the valve, valves have been made elliptical in form, and have been also set at different angles with relation to the plane of the bore of the body of the valve, but in every case the size of the valve-chamber has to be increased in diameter beyond the size or diameter of the bore of the body of the valve-cock. I overcome this difficulty by placing within the body B B′ a flange, *x*, for the purpose of forming a suitable seat for the valve *e*, and for the purpose of making the opening in the valve-seat equal in diameter to the bore of the pipe or pipes which may be attached to the body B B′ of the valve-cock, accomplishing the same without increasing the diameter of the valve-chamber A beyond that of the body B B′, thereby simplifying the construction of stop-valves or valve-cocks in point of labor and cost, and also obtaining the very desirable and apparent advantage of having the opening in the valve-seat of the same diameter as the bore of the pipe or pipes attached to the body of the valve, without an undue increase of the area of the surface of valve *e*, and also without increasing the diameter of the valve-chamber A beyond that of the body B B′.

Having thus described the nature, construction, and advantages of my improvement,

What I claim, as of my invention, is—

Constructing the valve-chamber A and chambers B and B′ of the body of the valve-cock so that they shall be of the same diameter, said valve-chamber being arranged at an angle to the axis of the body of the valve-cock, as herein described, and for the purpose set forth.

JOS. H. DAVIS.

Witnesses:

A. C. JOHNSTON,

JAS. G. THOMPSON.